(12) United States Patent
Kong et al.

(10) Patent No.: US 11,131,599 B1
(45) Date of Patent: Sep. 28, 2021

(54) SENSING MECHANISM OF TWO-DIMENSIONAL AIRFOIL MODEL

(71) Applicant: Nanjing University of Aeronautics and Astronautics, Jiangsu (CN)

(72) Inventors: Weihong Kong, Jiangsu (CN); Mingzhi Liu, Jiangsu (CN); Pan Li, Jiangsu (CN); Yongjie Shi, Jiangsu (CN); Renliang Chen, Jiangsu (CN)

(73) Assignee: Nanjing University of Aeronautics and Astronautics, Nanjing (CN)

( * ) Notice: Subject to any disclaimer, the term of this patent is extended or adjusted under 35 U.S.C. 154(b) by 0 days.

(21) Appl. No.: 17/333,119

(22) Filed: May 28, 2021

(30) Foreign Application Priority Data

May 29, 2020 (CN) .......................... 202010473766.7

(51) Int. Cl.
*G01M 9/08* (2006.01)
*G01L 19/14* (2006.01)

(52) U.S. Cl.
CPC ............. *G01M 9/08* (2013.01); *G01L 19/147* (2013.01)

(58) Field of Classification Search
None
See application file for complete search history.

(56) References Cited

U.S. PATENT DOCUMENTS

| 4,770,032 A * | 9/1988 | Plentovich .......... G01L 19/0007 73/147 |
| 5,513,526 A * | 5/1996 | Lefebvre ................ G01M 9/062 73/147 |
| 6,553,823 B2 * | 4/2003 | Omotani .................. G01M 9/08 73/147 |
| 2010/0036648 A1 * | 2/2010 | Mangalam .............. G06F 30/20 703/2 |

OTHER PUBLICATIONS

Chinese Journal of Theoretical and Applied Mechanics, vol. 50, No. 4, Jul. 2018.

* cited by examiner

*Primary Examiner* — Andre J Allen
*Assistant Examiner* — Jermaine L Jenkins
(74) *Attorney, Agent, or Firm* — Bay State IP, LLC

(57) ABSTRACT

A sensing mechanism of a two-dimensional airfoil model, which includes pressure sensor groups, multiple first tubes, the second tube, and a cavity. The pressure sensor groups are vertically fixed to mounting holes in the surface of the two-dimensional airfoil model. The pressure measurement surface of each pressure sensor is vertical to the surface of the two-dimensional airfoil model. Multiple mounting holes are opened in and vertical to the surface of the two-dimensional airfoil model. The cavity is fixed to the interior of the two-dimensional airfoil model. The reference pressure end of each pressure sensor is connected to the cavity through the first tube, the multiple pressure sensors of the pressure sensor groups are in one-to-one correspondence with the multiple first tubes. The cavity is connected with the first end of the second tube. The second end of the second tube is located in the air outside the two-dimensional airfoil model.

9 Claims, 4 Drawing Sheets

SENSING MECHANISM OF TWO-DIMENSIONAL AIRFOIL MODEL

CROSS REFERENCE TO RELATED APPLICATION

This application takes priority from and claims the benefit of Chinese Patent Application Serial No. 202010473766.7 filed on May 29, 2020, the contents of which are herein incorporated by reference.

BACKGROUND OF THE INVENTION

Field of the Invention

The present invention relates to the field of aerodynamics, and in particular, to a sensing mechanism of a two-dimensional airfoil model.

DESCRIPTION OF THE RELATED ART

A rotor is a key part of the helicopter. It can provide the lift and the thrust for the helicopter, as well as the force and the moment required by maneuvering flight. The aerodynamic force analysis of a rotor is a core problem of the helicopter aerodynamics.

Surface pressure measurement of a two-dimensional airfoil model in a wind tunnel is an important method for researching the aerodynamic problem of the rotor. However, currently, the pitot tube is mainly utilized as the experimental device for pressure measurement, wherein there are the following defects:

The pitot tube may generate disturbance to the flow field in itself, thereby reducing the measurement accuracy. Such error may be more obvious in the dynamic pressure measurement process.

When the pitot tube is used to conduct the experiment, theoretically the air in the pitot tube and the rubber tube must be firstly and completely exhausted. Then, the lower end of the pitot tube is put into the water flow, meanwhile, the inlet of a pitot pressure tube just faces the flowing direction of a test point. Actually, bubbles are hard to be discharged completely. Once the lower end of the pitot tube leaves from the water's surface, the bubbles may enter the experimental device. So, the air should be discharged again. Such process is very tedious. Additionally, it is hard to be achieved that the inlet of the pitot pressure tube just faces the flowing direction of the test point.

SUMMARY OF THE INVENTION

The objective of the present invention is to propose a sensing mechanism of a two-dimensional airfoil model in order to improve the measurement accuracy of surface pressure distribution of the two-dimensional airfoil model.

To achieve the above objective, the present invention provides the following solution:

A sensing mechanism of a two-dimensional airfoil model comprises pressure sensor groups, multiple first tubes, the second tube, and a cavity.

The pressure sensor groups are vertically fixed to mounting holes in the surface of the two-dimensional airfoil model. The pressure measurement surface of each pressure sensor in the pressure sensor groups is vertical to the surface of the two-dimensional airfoil model. Multiple mounting holes are opened in and vertical to the surface of the two-dimensional airfoil model.

The cavity is fixed to the interior of the two-dimensional airfoil model. The reference pressure end of each pressure sensor in the pressure sensor groups is connected to the cavity through the first tube, and the multiple pressure sensors of the pressure sensor groups are in one-to-one correspondence with the multiple first tubes. The cavity is connected with the first end of the second tube. The second end of the second tube is located in the air outside the two-dimensional airfoil model.

Optionally, multiple through holes are opened in the two-dimensional airfoil model in the spanwise direction. A rotating shaft of the two-dimensional airfoil model is located in the second through hole in the geometrical leading edge of the two-dimensional airfoil model.

Optionally, the two-dimensional airfoil model comprises the first end section, a middle section, and the second end section. The first end section, the middle section, and the second end section are sequentially fixed by pins, and are also fixed in the spanwise direction in a gluing manner. The pressure sensor group, the first tube, and the cavity are located in the middle section.

Optionally, the first groove and the second groove are opened in the middle section.

The cavity is fixed in the first groove. A part of tube section of the first end of the second tube is located in the first groove. A part of tube section of the second end of the second tube extends to the outside of the two-dimensional airfoil model through the through hole in the first end section.

The multiple first tubes are fixed in the second groove.

The second groove and the first groove are communicated. Signal lines of the pressure sensor groups extend to the outside of the two-dimensional airfoil model sequentially through the second groove, the first groove, and the through hole in the second end section.

Optionally, the pressure sensor groups comprise the first sensor group and the second sensor group. Both the first sensor group and the second sensor group comprise multiple pressure sensors.

The first sensor group is fixed in the mounting holes of the upper surface of the two-dimensional airfoil model. The second sensor group is fixed in the mounting holes of the lower surface of the two-dimensional airfoil model. The pressure sensors of the first sensor group and the pressure sensors of the second sensor group are interleaved in the chordwise direction of the two-dimensional airfoil model.

Optionally, the number of the pressure sensors of the first sensor group is larger than the number of the pressure sensors of the second sensor group.

Optionally, the first sensor group comprises 14 pressure sensors. The second sensor group comprises 8 pressure sensors.

Optionally, each pressure sensor of the pressure sensor groups is the HTP504 miniature dynamic pressure sensor.

Optionally, each mounting hole in the surfaces of the two-dimensional airfoil model is a stepped hole. The stepped hole comprises the first hole section and the second hole section. The first hole section is a hole section close to the interior of the two-dimensional airfoil model. The second hole section is a hole section close to the surface of the two-dimensional airfoil model. The diameter of the first hole section is smaller than the diameter of the second hole section.

Optionally, the mounting holes further comprise shims. The shims are located at the second hole end of the second hole section. The shims are used for filling gaps formed by the mounting holes in the surfaces of the two-dimensional airfoil model. The second hole end of the second hole section is one end located on the surface of the two-dimensional airfoil model. The first hole end of the second hole section is jointed with the first hole section.

According to specific embodiments provided by the present invention, the present invention discloses the following technical effects:

The miniature dynamic pressure sensors are installed in the interior of the airfoil model in the present invention, so as to ensure the completeness of the two-dimensional airfoil model surface and avoid damage of the smoothness of the model surface. So, the experimental device does not influence the flow field in itself. The measurement accuracy is high, and it may reach 0.03 Pa. The error is smaller than 2 out of 1000.

Furthermore, in the present invention, the miniature dynamic pressure sensors move on the model in the spanwise direction; so, the miniature dynamic pressure sensors are interleaved in the upper surface and the lower surface of the two-dimensional airfoil model. By such arrangement manner, the miniature dynamic pressure sensors at the geometric trailing edge of the two-dimensional airfoil model are closer to be mounted. The measured dynamic pressure data of the geometric trailing edge is closer to the actual situation, so as to provide the advantageous support to accurately research the dynamic stall problem of the reverse flow region. Moreover, the miniature dynamic pressure sensor has a short response time and as high as 3 KHz of the sampling rate, can acquire the dynamic pressure data of the two-dimensional airfoil model surface in real time, and can reflect the unsteady aerodynamic force of the airfoil surface in real time. The experiment has high repeatability. After the sensors are mounted in the model in one step, multiple experiments can be conducted, so as to improve the working efficiency.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other accompanying drawings from these accompanying drawings without creative efforts.

Figure 1:
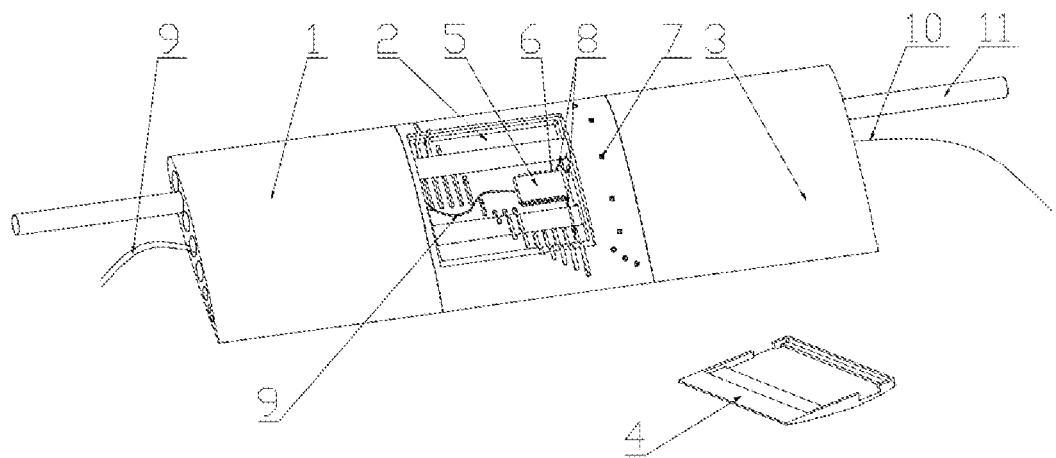
FIG. 1 is a schematic diagram showing a sensing mechanism of a reverse side of a two-dimensional airfoil model in the present invention.
Figure 2:
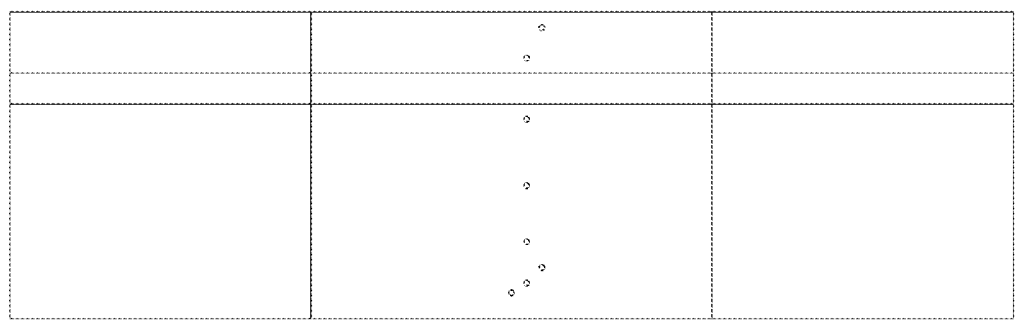
FIG. 2 is a schematic diagram showing mounting positions of sensors in the lower surface of a two-dimensional airfoil model in the present invention.
Figure 3:
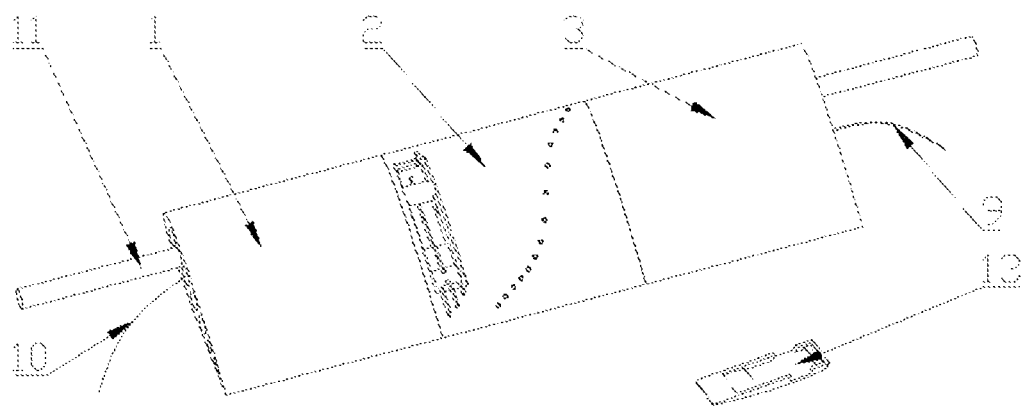
FIG. 3 is a schematic diagram showing a sensing mechanism of a front side of a two-dimensional airfoil model in the present invention.
Figure 4:
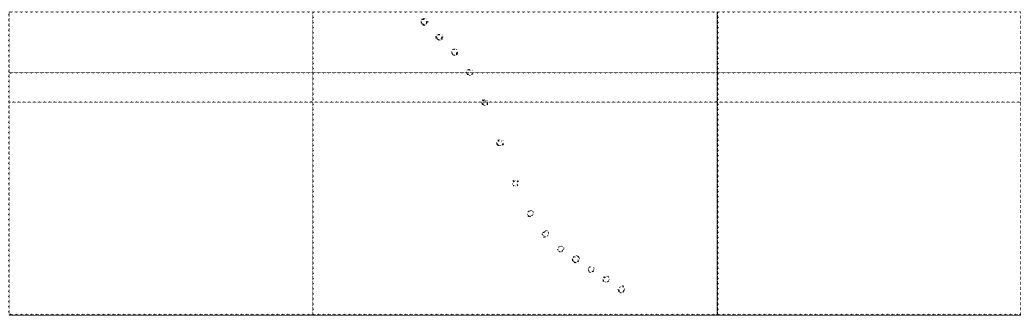
FIG. 4 is a schematic diagram showing mounting positions of sensors in the upper surface of a two-dimensional airfoil model in the present invention.

Reference signs in the drawings: 1—first end section of two-dimensional airfoil model, 2—middle section of two-dimensional airfoil model, 3—second end section of two-dimensional airfoil model, 4—front-side cover plate, 5—cavity, 6—cavity connection tube, 7—pressure sensor, 8—first tube, 9—second tube, 10—signal line, 11—rotating shaft, 12—shim, and 13—reversed-side cover plate.

DETAILED DESCRIPTION OF THE SEVERAL EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

To make the foregoing objective, features, and advantages of the present invention more apparent and more comprehensible, the present invention is further described in detail below with reference to the accompanying drawings and specific embodiments.

FIG. 1 is a schematic diagram showing a sensing mechanism of a reverse side of a two-dimensional airfoil model in the present invention. As shown in FIG. 1, a sensing mechanism of a two-dimensional airfoil model of the present invention comprises pressure sensor groups, multiple first tubes 8, the second tube 9, and a cavity 5. Each pressure sensor 7 of the pressure sensor groups is vertically fixed to each mounting hole in the surface of the two-dimensional airfoil model. The pressure measurement surface of each pressure sensor 7 in the pressure sensor groups is vertical to the surface of the two-dimensional airfoil model. Multiple mounting holes are opened in and vertical to the surface of the two-dimensional airfoil model.

The cavity 5 is fixed to the interior of the two-dimensional airfoil model. The reference pressure end of each pressure sensor in the pressure sensor groups is connected to the cavity through the first tube 8, and the multiple pressure sensors of the pressure sensor groups are in one-to-one correspondence with the multiple first tubes 8. The cavity 5 is connected with the first end of the second tube 9. The second end of the second tube 9 is located in the air outside the two-dimensional airfoil model.

The two-dimensional airfoil model of the present invention consists of the first end section 1, the middle section 2, and the second end section 3. They are fixed by pins in pairs, so as to ensure that no relative movement occurs. The first end section 1, the middle section 2, and the second end section 3 are fixed in the spanwise direction in a gluing manner, so as to ensure the completeness of the upper surface and the lower surface. The first end section 1 and the second end section 3 are totally the same. Multiple through holes are formed in the span wise direction of the interiors of the first end section and the second end section. So, the whole two-dimensional airfoil model comprises multiple through holes in the spanwise direction. A rotating shaft 11 is located in the second through hole at the geometric leading edge of the two-dimensional airfoil model. The left through holes aim to reduce the weight of the model in the premise of ensuring the strength of the model, thereby reducing the inertia of the model. In the specific embodiment, the number of the through holes is determined according to the actual requirements. For example, if the NACA0018 airfoil is utilized as the two-dimensional airfoil model, there are eight through holes.

The pressure sensor 7, the first tube 8, and the cavity 5 are fixed to the interior of the middle section 2. The first end section 1 and the second end section 3 aim to ensure the completeness of the model, such that the sensor data of the two side positions of the middle section 2 is not influenced by other factors. The pressure sensor groups comprise the first sensor group and the second sensor group. Both the first sensor group and the second sensor group comprise multiple pressure sensors. The first sensor group is fixed in the mounting holes of the upper surface of the two-dimensional airfoil model. The second sensor group is fixed in the mounting holes of the lower surface of the two-dimensional airfoil model. The number of the pressure sensors of the first sensor group is larger than the number of the pressure sensors of the second sensor group. As shown in FIG. 1 to FIG. 4, the first sensor group comprises 14 pressure sensors, that is, 14 pressure sensors are mounted in the upper surface (front side) of the two-dimensional airfoil model. The second sensor group comprises 8 pressure sensors, that is, 8 pressure sensors are mounted in the lower surface (reverse side) of the two-dimensional airfoil model.

Figure 5:
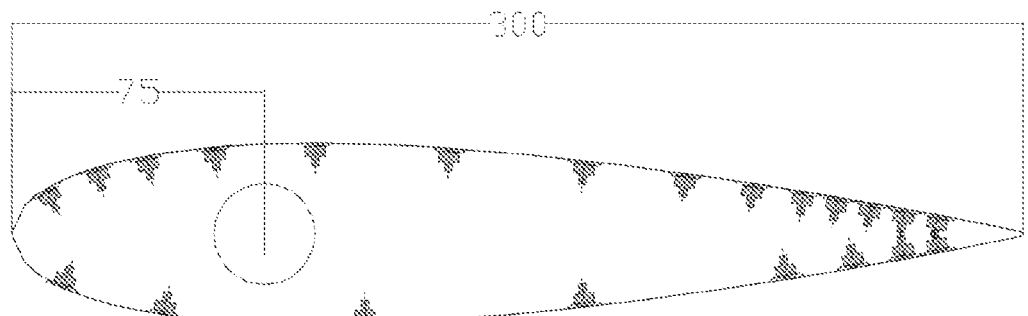
FIG. 5 is a schematic diagram showing mounting positions of chordwise sensors of a two-dimensional airfoil model in the present invention.

If the pressure sensors are too closely mounted at the geometrical trailing edge, they may be mutually influenced on the upper surface and the lower surface of the model. Therefore, the present invention changes the spanwise positions of the pressure sensors, but keeps the chordwise position changeless. Then, the pressure sensors on the upper surface and the lower surface of the model are interleaved. As shown in FIG. 5, the pressure sensors of the first sensor group and the pressure sensors of the second sensor group are interleaved in the chordwise direction of the two-dimensional airfoil model. In the experiment, the two-dimensional airfoil model is vertical to the incoming flow, such that the pressure data of the same airfoil still can be obtained. In the experiment, the normal force coefficient, the axial force coefficient, the lift coefficient, the resistance coefficient, and the ¼ chord moment coefficient of the airfoil should be obtained according to the measured pressure data of the pressure sensor 7. Therefore, the whole airfoil should be equipped with the pressure sensors 7, wherein 14 pressure sensors are mounted on the upper surface of the airfoil model, and 8 pressure sensors are mounted on the lower surface thereof. The sensing mechanism of the present invention is mainly applied to the dynamic stall experiment research of the rotor reverse flow region; so, it requires more accurate data of the geometric trailing edge; then, the pressure sensors 7 are further closely mounted at the geometric trailing edge.

Figure 6:
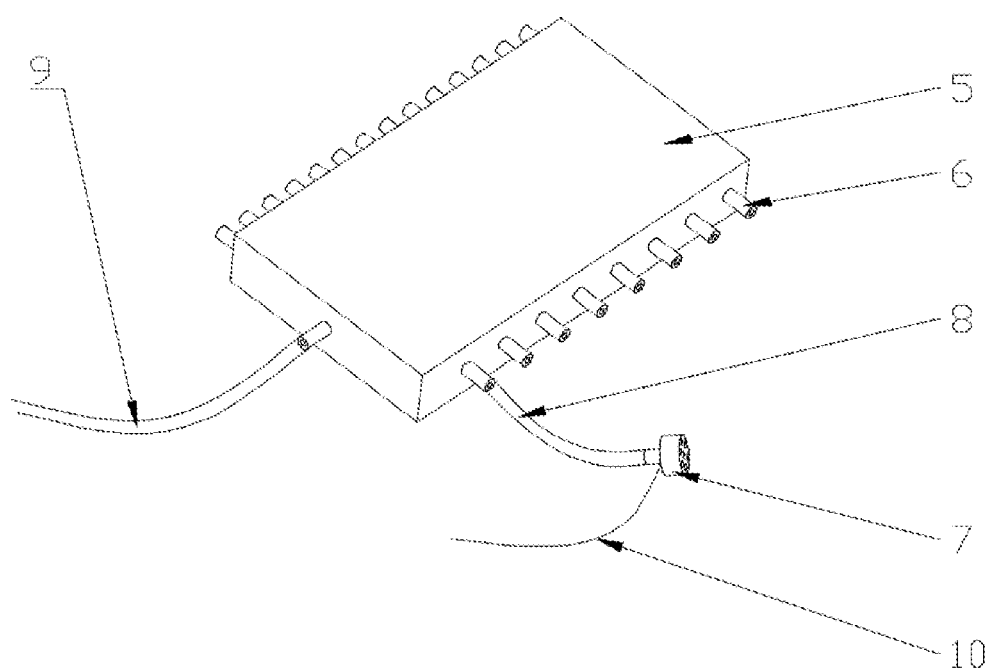
FIG. 6 is a schematic diagram showing connection of a pressure sensor and a cavity in the present invention.

The cavity 5 of the present invention is located in the front side of the middle section 2. As shown in FIG. 6, the reference pressures of all the pressure sensors 7 are gathered to the cavity 5 by the first tubes 8 and then are connected with the air through the second tube 9. After the pressure sensors 7 and the cavity 5 are completely mounted. The front-side cover plate 4 and the reverse-side cover plate 13 cover the middle section 2 of the two-dimensional airfoil model, so as to ensure the surface completeness of the two-dimensional airfoil model.

Figure 7:
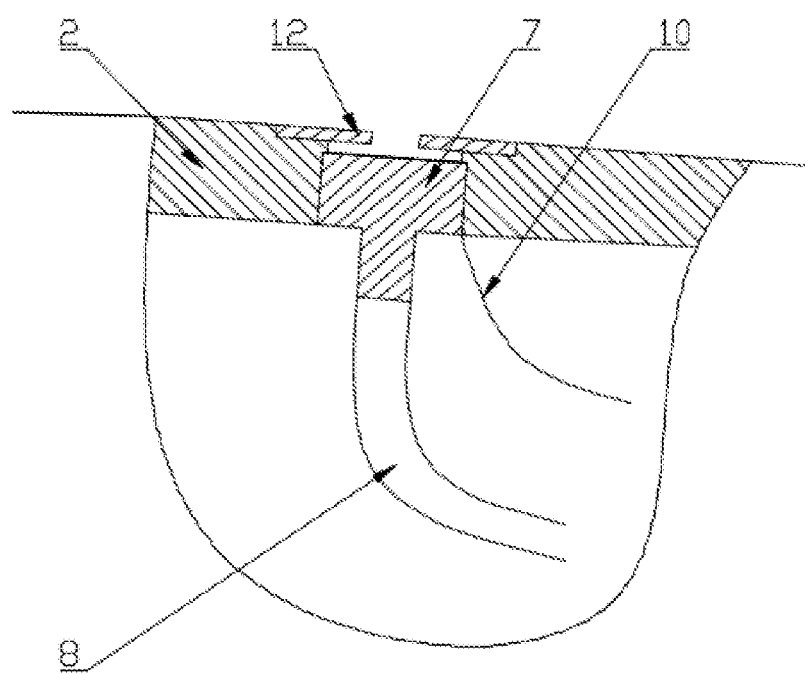
FIG. 7 is a position schematic diagram when a sensor is fixed to a mounting hole in the present invention.

In view of the special structure of the pressure sensor 7, its upper surface has vent holes in the center and the periphery; so, it must ensure that there is a certain interval between the shim 12 and the upper surface of the pressure sensor 7. Therefore, the mounting hole in the surface of the two-dimensional airfoil model is a stepped hole. As shown in FIG. 7, the stepped hole comprises the first hole section and the second hole section. The first hole section is a hole section close to the interior of the two-dimensional airfoil model. The second hole section is a hole section close to the surface of the two-dimensional airfoil model. The diameter of the first hole section is smaller than the diameter of the second hole section. To ensure the completeness of the model surface, the pressure sensor 7 and the middle section 2 of the two-dimensional airfoil model are mounted by the steps: drilling a groove in the model, then drilling a stepped hole from the outer surface of the model to the interior in vertical to the model surface, and mounting the pressure sensor 7 from the interior. In the middle section 2 of the two-dimensional airfoil model, according to the mounting position of the sensor, a stepped through hole is drilled from exterior to the interior in vertical to the model surface; grooves are drilled in the corresponding positions in the model. The grooves are used for arranging the first tube 8 and the signal line 10. Specifically, the first groove and the second groove are opened in the middle section 2. The cavity 5 is fixed in the first groove. A part of tube section of the first end of the second tube 9 is located in the first groove. A part of tube section of the second end of the second tube 9 extends to the outside of the two-dimensional airfoil model through the through hole in the first end section. The second groove and the first groove are communicated. Multiple first tubes 8 are fixed in the second groove. The first end of the first tube 8 is connected with the reference pressure end of the pressure sensor 7 of the pressure sensor group. The second end of the first tube 8 is connected to the cavity 5 in the first groove. Signal lines of the pressure sensor groups extend to the outside of the two-dimensional airfoil model sequentially through the second groove, the first groove, and the through hole in the second end section 3.

To ensure the completeness of the model surface, the stepped through hole in the model should be filled with shims 12. The model surface is a curved surface, but the shims 12 are flat; so, after the shims are mounted, they should be polished to ensure the smoothness of the model surface. The pressure sensor 7 is a high-precision element. So, to prevent scraps in the polishing process from entering the pressure sensor 7, the mounting sequence of the pressure sensor 7 and the shims 12 should be: the shims 12 are firstly mounted; then, the pressure sensor 7 is mounted. The pressure sensors should be mounted in the reverse side and the front side of the two-dimensional airfoil model by the same mounting method. But there is a unique difference: the cavity 5 is not placed in the groove on the reverse side, but the pressure sensor is directly connected with the cavity 5 in the groove on the front side through the first tube 8.

Referring to the parameters of each component in the present invention, the present invention provides the following example:

The two-dimensional airfoil model utilizes the NACA0018 airfoil with the specification of 1000*300. The model material utilizes ABS, which has the lower mass in comparison with the other materials in the premise of ensuring high strength and rigidity. There are two main objectives to select such airfoil: in one aspect, the airfoil has a smaller curvature and a larger thickness; so, the pressure sensors can be further closely mounted at the geometrical trailing edge as back as possible to obtain more data, and the experiment is closer to the actual situation when the experimental data is used for processing the interpolation in the later stage. In the other aspect, the airfoil is thicker, so, its interior has a larger usable space to arrange the signal lines of the sensors. 22 holes vertical to the model surface are drilled in proper positions of the blade model surface, such that the miniature dynamic pressure sensors can be mounted in the holes, and the pressure measurement surface is vertical to the model surface. Some grooves are drilled in the blade model, such that the first tubes and the signal lines of the miniature dynamic pressure sensor can be conveniently arranged.

The pressure sensor 7 utilizes the HTP504 miniature dynamic pressure sensor with the frequency of 3 KHz, which has small volume, small weight, the measuring range of 0-2 Kpa, and the error range less than 2 out of 1000. The pressure sensor can be mounted in the model vertical to the airfoil surface, which can conduct static pressure measurement and dynamic pressure measurement.

The cavity 5 adopts a cubic cavity with the specification of 70*40*10, its thickness is 2 mm, and the material is the conventional transparent ABS. 8 holes with the diameter of 2.2 mm should be drilled in the left side of the cavity, and 14 holes with the diameter of 2.2 mm should be drilled in the right side. Then, cavity connection tubes 6 are inserted into the cavity through these holes and are used for connecting the first tubes 8 of the reference pressure ends of the pressure sensors 7. Each first tube 8 utilizes an aluminum tube with the length of 10 mm, the outer diameter of 2.2 mm, and the inner diameter of 1 mm.

The second tube 9 utilizes a rubber hose with the inner diameter of 2.2 mm.

Each embodiment of the present specification is described in a progressive manner, each embodiment focuses on the difference from other embodiments, and the same and similar parts between the embodiments may refer to each other.

Several examples are used for illustration of the principles and implementation methods of the present invention. The description of the embodiments is used to help illustrate the method and its core principles of the present invention. In addition, a person of ordinary skill in the art can make various modifications in terms of specific embodiments and scope of application in accordance with the teachings of the present invention. In conclusion, the content of this specification shall not be construed as a limitation to the present invention.

What is claimed is:

1. A sensing mechanism of a two-dimensional airfoil model, comprising pressure sensor groups, multiple first tubes, the second tube, and a cavity; wherein
    the pressure sensor groups are vertically fixed to mounting holes in the surface of the two-dimensional airfoil model; the pressure measurement surface of each pressure sensor in the pressure sensor groups is vertical to the surface of the two-dimensional airfoil model; multiple mounting holes are opened in and vertical to the surface of the two-dimensional airfoil model; the pressure sensor groups comprise the first sensor group and the second sensor group; both the first sensor group and the second sensor group comprise multiple pressure sensors;
    the first sensor group is fixed in the mounting holes of the upper surface of the two-dimensional airfoil model; the second sensor group is fixed in the mounting holes of the lower surface of the two-dimensional airfoil model; the pressure sensors of the first sensor group and the pressure sensors of the second sensor group are interleaved in the chordwise direction of the two-dimensional airfoil model;
    the cavity is fixed to the interior of the two-dimensional airfoil model; the reference pressure end of each pressure sensor in the pressure sensor groups is connected to the cavity through the first tube, and the multiple pressure sensors of the pressure sensor groups are in one-to-one correspondence with the multiple first tubes; the cavity is connected with the first end of the second tube; the second end of the second tube is located in the air outside the two-dimensional airfoil model.

2. The sensing mechanism of a two-dimensional airfoil model according to claim 1, wherein multiple through holes are opened in the two-dimensional airfoil model in the spanwise direction; a rotating shaft of the two-dimensional airfoil model is located in the second through hole in the geometrical leading edge of the two-dimensional airfoil model.

3. The sensing mechanism of a two-dimensional airfoil model according to claim 2, wherein the two-dimensional airfoil model comprises the first end section, the middle section, and the second end section; the first end section, the middle section, and the second end section are sequentially fixed by pins, and are also fixed in the spanwise direction in a gluing manner; the pressure sensor group, the first tube, and the cavity are located in the middle section.

4. The sensing mechanism of a two-dimensional airfoil model according to claim 3, the first groove and the second groove are opened in the middle section;
    the cavity is fixed in the first groove; a part of tube section of the first end of the second tube is located in the first groove; a part of tube section of the second end of the second tube extends to the outside of the two-dimensional airfoil model through the through hole in the first end section;
    the multiple first tubes are fixed in the second groove;
    the second groove and the first groove are communicated; signal lines of the pressure sensor groups extend to the outside of the two-dimensional airfoil model sequentially through the second groove, the first groove, and the through hole in the second end section.

5. The sensing mechanism of a two-dimensional airfoil model according to claim 1, the number of the pressure sensors of the first sensor group is larger than the number of the pressure sensors of the second sensor group.

6. The sensing mechanism of a two-dimensional airfoil model according to claim 5, the first sensor group comprises 14 pressure sensors; the second sensor group comprises 8 pressure sensors.

7. The sensing mechanism of a two-dimensional airfoil model according to claim 1, wherein each pressure sensor of the pressure sensor groups is the HTP504 miniature dynamic pressure sensor.

8. The sensing mechanism of a two-dimensional airfoil model according to claim 7, each mounting hole in the surfaces of the two-dimensional airfoil model is a stepped hole; the stepped hole comprises the first hole section and the second hole section; the first hole section is a hole section close to the interior of the two-dimensional airfoil model; the second hole section is a hole section close to the surface of the two-dimensional airfoil model; the diameter of the first hole section is smaller than the diameter of the second hole section.

9. The sensing mechanism of a two-dimensional airfoil model according to claim 8, the mounting hole further comprises shims; the shims are located at the second hole end of the second hole section; the shims are used for filling gaps formed by the mounting holes in the surfaces of the two-dimensional airfoil model; the second hole end of the second hole section is one end located on the surface of the two-dimensional airfoil model; the first hole end of the second hole section is jointed with the first hole section.

\* \* \* \* \*